United States Patent [19]
Shinozaki et al.

[11] Patent Number: 6,034,189
[45] Date of Patent: *Mar. 7, 2000

[54] SOLID TITANIUM CATALYST COMPONENT FOR OLEFIN POLYMERIZATION, PROCESS FOR PREPARATION OF THE SAME, OLEFIN POLYMERIZATION CATALYST AND PROCESS FOR OLEFIN POLYMERIZATION

[75] Inventors: Tetsunori Shinozaki; Yasushi Nakayama; Junji Saito; Kenji Sugimura; Mamoru Kioka, all of Yamaguchi, Japan

[73] Assignee: Mitsui Petrochemical Industries, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/641,040

[22] Filed: Apr. 30, 1996

Related U.S. Application Data

[63] Continuation-in-part of application No. 08/444,680, May 18, 1995, abandoned.

[30] Foreign Application Priority Data

May 19, 1994 [JP] Japan .................................. 6-105741

[51] Int. Cl.[7] ........................................... C08F 4/44
[52] U.S. Cl. ...................... 526/125.3; 502/126; 502/127; 526/351
[58] Field of Search .......................................... 526/125.3

[56] References Cited

U.S. PATENT DOCUMENTS

| | | | |
|---|---|---|---|
| 4,784,983 | 11/1988 | Mao et al. | 526/125.3 |
| 5,247,032 | 9/1993 | Kioka et al. | 526/125.3 |
| 5,360,776 | 11/1994 | Iiskola et al. | 526/125.6 |

FOREIGN PATENT DOCUMENTS

| | | |
|---|---|---|
| 0398439 | 11/1990 | European Pat. Off. |
| 0435332 | 7/1991 | European Pat. Off. |
| 2111066 | 6/1983 | United Kingdom |

*Primary Examiner*—David W. Wu
*Assistant Examiner*—Roberto Rabago
*Attorney, Agent, or Firm*—Birch, Stewart, Kolasch & Birch, LLP

[57] ABSTRACT

Disclosed is a solid titanium catalyst component for olefin polymerization comprising magnesium, titanium, halogen, and (C) a phthalic diester represented by the following structural formula (i):

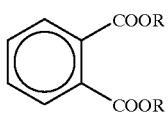

(i)

wherein R is a branched hydrocarbon group of 7 carbon atoms, and two or R may be the same as or different from each other. Also disclosed are a process for preparing the solid titanium catalyst component, an olefin polymerization catalyst containing said solid titanium catalyst component and a process for olefin polymerization using the olefin polymerization catalyst. According to the present invention, the olefin polymer having high stereoregularity can be produced in a prominently high yield per catalyst unit.

6 Claims, 1 Drawing Sheet

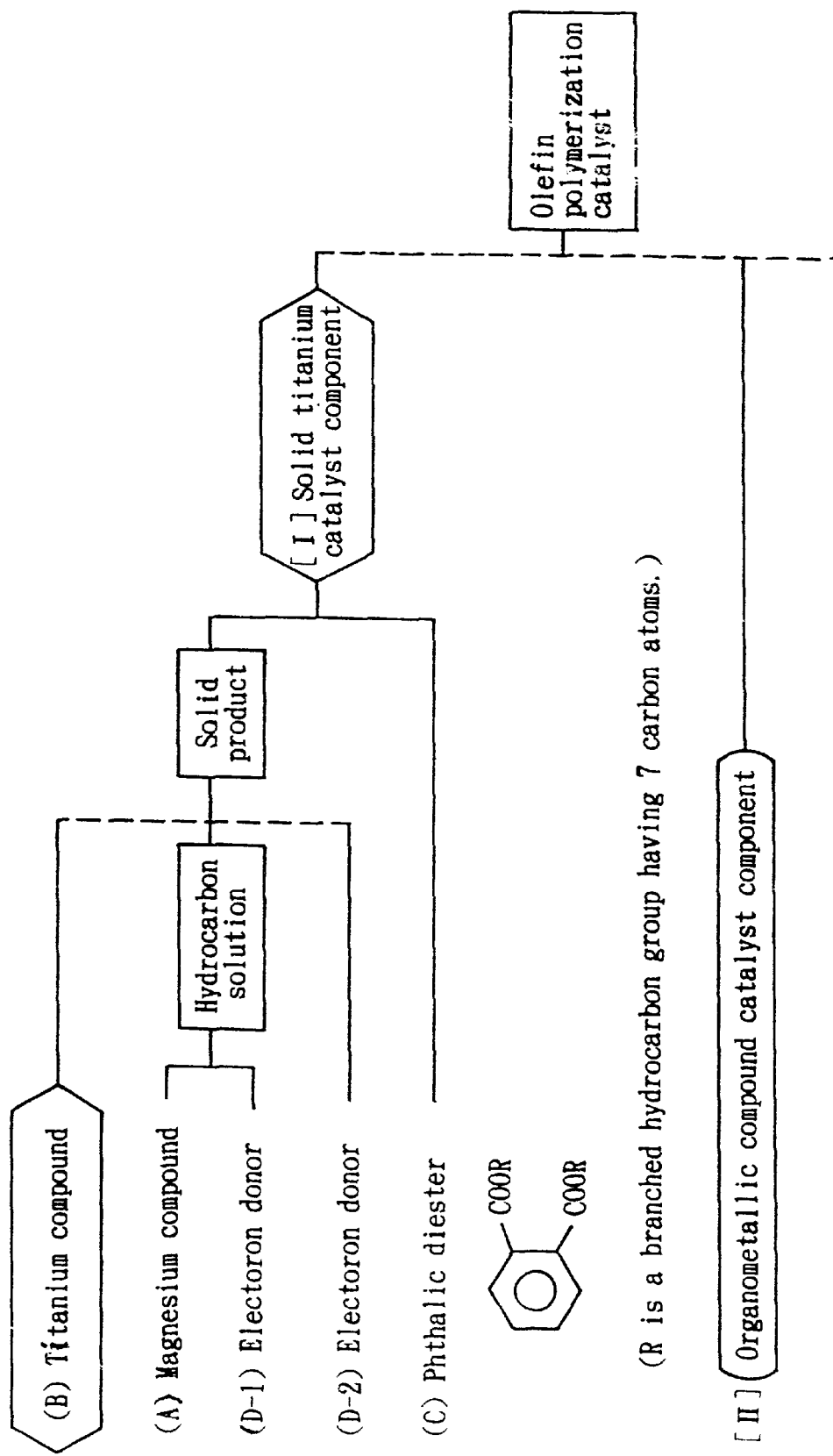
FIGURE

SOLID TITANIUM CATALYST COMPONENT FOR OLEFIN POLYMERIZATION, PROCESS FOR PREPARATION OF THE SAME, OLEFIN POLYMERIZATION CATALYST AND PROCESS FOR OLEFIN POLYMERIZATION This application is a continuation-in-part of application Ser. No. 08/444,680 filed on May 19, 1995 now abandoned, the entire contents of which are hereby incorporated by reference.

FIELD OF THE INVENTION

The present invention relates to a solid titanium catalyst component by which an olefin can be polymerized with prominently high activity and an olefin polymer of high stereoregularity can be prepared, and also relates to a process for preparation of the solid titanium catalyst component, to an olefin polymerization catalyst containing the solid titanium catalyst component and to a process for olefin polymerization using the olefin polymerization catalyst.

BACKGROUND OF THE INVENTION

It is well known that polyolefins such as crystalline polypropylene are prepared using "Ziegler-Natta catalysts" comprising compounds of Group IV to Group VI transition metals of the periodic table and organometallic compounds of Group I to Group III metals of the periodic table. Further, processes to obtain crystalline polyolefins of high stereoregularity with high polymerization activity using these catalysts have been earnestly studied.

For example, Japanese Patent Laid-Open Publications No. 209207/1986, No. 104810/1987, No. 104811/1097, No. 104812/1987, No. 104813/1987, No. 311106/1989, No. 318011/1989 and No. 166104/1990 describe that when an olefin is polymerized using a catalyst formed from a titanium-containing solid catalyst component which comprises titanium, magnesium, halogen and an electron donor, an organoaluminum compound and an electron donor, high polymerization activity is obtained and polyolefin of high stereoregularity can be obtained.

Also the present applicant has made various researches on the olefin polymerization catalysts and processes for olefin polymerization by which crystalline polyolefins of high stereoregularity can be obtained with high polymerization activity, and has made a great number of proposals (e.g., Japanese Patent Laid-Open Publications No. 108385/1975, No. 126590/1975, No. 20297/1976, No. 28189/1976, No. 64586/1976, No. 92885/1976, No. 136625/1976, No. 87489/1977, No. 100596/1977, No. 147688/1977, No. 104593/1977, No. 2580/1978, No. 40093/1978, No. 40094/1978, No. 43094/1978, No. 135102/1980, No. 135103/1980, No. 152710/1980, No. 811/1981, No. 11908/1981, No. 18606/1981, No. 83006/1983, No. 138705/1983, No. 138706/1983, No. 138707/183, No. 138708/1983, No. 138709/1983, No. 138710/1983, No. 138715/1983, No. 138720/1983, No. 138721/1983, No. 215408/1983, No. 47210/1984, No. 117508/1984, No. 117509/1984, No. 207904/1984, No. 206410/1984, No. 206408/1984, No. 206407/1984, No. 69815/1986, No. 69821/1986, No. 69822/1986, No. 69823/1986, No. 22806/1988, 95208/1988, No. 199702/1988, No. 199703/1988, No. 202603/1988, No. 202604/1988, No. 223008/1988, No. 223009/1988, No. 264609/1988, No. 87610/1989, No. 156305/1989, No. 77407/1990, No. 84404/1990, No. 229807/1990, No. 229806/1990 and No. 229805/1990).

In the production of polyolefins, the productivity can be more enhanced and the production cost can be more reduced by the use of olefin polymerization catalysts having higher activity. Further, also from the viewpoints of "environmental problem" such as harmfulness of catalysts and "environmental protection" such as recycling of resources, the amounts of catalysts contained in the polyolefins are desired to be as small as possible, and consequently it becomes more and more important to increase catalytic activity and to prepare polyolefins in high yields per catalyst unit.

As described above, the olefin polymerization catalyst and the olefin polymerization process, by the use of which an olefin can be polymerized with much higher activity and polyolefin of high stereoregularity can be prepared, are of industrially great value, and the advent thereof is eagerly desired.

OBJECT OF THE INVENTION

The present invention has been made in the light of such prior art technique as mentioned above, and it is an object of the invention to provide a solid titanium catalyst component for olefin polymerization by which an olefin polymer of high stereoregularity can be prepared in a prominently high yield per catalyst unit and to provide a process for preparation of the solid titanium catalyst component, an olefin polymerization catalyst containing the solid titanium catalyst component and a process for olefin polymerization using the olefin polymerization catalyst.

SUMMARY OF THE INVENTION

The solid titanium catalyst component according to the invention comprises:

magnesium, titanium, halogen, and (C) a phthalic diester represented by the following structural formula (i):

wherein R is a branched hydrocarbon group of 7 carbon atoms, and two of R may be the same as or different from each other.

The solid titanium catalyst component according to the invention preferably further comprises (D) an electron donor other than the phthalic diester in addition to the magnesium, titanium, halogen and (C) the phthalic diester represented by the above formula (i).

This solid titanium catalyst component is prepared by contacting (A) a magnesium compound with (B) a titanium compound in the liquid state in the presence of (C) the phthalic diester represented by the above formula (i) and (D) the electron donor other than the phthalic diester, or by contacting a solid product with (C) the phthalic diester, said solid product being obtained by contacting (A) a magnesium compound with (B) a titanium compound in the liquid state in the presence of (D) the electron donor other than the phthalic diester.

The olefin polymerization catalyst according to the invention comprises:

[I] the above-mentioned solid titanium catalyst component,

[II] an organometallic compound catalyst component, and

[III] an electron donor.

A process for olefin polymerization comprising polymerizing olefins having 2 to 20 carbon atoms at a temperature of about 20 to 300° C. and at a pressure of from atmospheric pressure to 100 kg/cm² in the presence of an olefin polymerization catalyst comprising the following components (I), (II) and (III);

(I) a solid titanium catalyst component which comprises
magnesium,
titanium,
halogen, (C) a phthalic diester represented by the following formula (i),

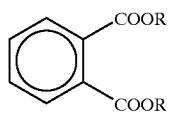

wherein R is a substituted hydrocarbon group having a total of seven carbon atoms and at least one methyl substituent, and two of Rs may be the same as or different from each other, and (D) an electron donor other than the phthalic diester (C), wherein said solid titanium catalyst component (I) is obtained by contacting a hydrocarbon solution of a magnesium compound (A) with a titanium compound (B) in a liquid state to form a solid product or first preparing a hydrocarbon solution of the magnesium compound (A) and the titanium compound (B) and then forming a solid product therefrom, said reaction of forming the solid product being carried out in the presence of at least one electron donor (D-2) as said electron donor (D), which is selected from the group consisting of mono-carboxylic acid esters, aliphatic carboxylic acids, acid anhydrides, ketones, ethers, alkoxy group containing alcohols, aliphatic carbonates, organic silicone compounds and organic phosphorous compounds having a P—O—C bond, and during or after the formation of the solid product, contacting the solid product with the phthalic diester (C), said contact of the magnesium compound (A) with the titanium compound (B) being carried out at a sufficiently low temperature and thereafter elevating the temperature to 85° C. to 95° C., where the amount of said at least one electron donor (D-2) is 0.01 to 1.0 mole per mole of the magnesium compound (A) and the amount of the phthalic diester (C) is 0.05 to 0.5 mole per mol of the magnesium compound (A);

(II) an organometallic compound catalyst component represented by the following formula,

$R^a{}_n AlX_{3-n}$ wherein $R^a$ is a hydrocarbon group of 1 to 12 carbon atoms, X is halogen or hydrogen, and n is 1 to 3; and (III) an electron donor represented by the following formula,

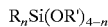
$R_n Si(OR')_{4-n}$ wherein R and R' are each a hydrocarbon group, and 0<n<4, or a polyether;

wherein the amount of the solid catalyst component (I) is 0.001 to 100 mmol, in terms of Ti atom, based on 1 liter of the polymerization volume, the amount of metal atom in the organometallic compound catalyst component (II) is in the range of 1 to 2000 mol, based on 1 mol of the titanium atom in the solid catalyst component (I), and the amount of the electron donor (III) is 0.001 to 10 mol, based on 1 mol of the metal atom in the organometallic compound catalyst component (II).

BRIEF DESCRIPTION OF THE DRAWING

FIGURE shows steps of a process for preparing an olefin polymerization catalyst including an example of a process for preparing a solid titanium catalyst component [I] according to the present invention.

DETAILED DESCRIPTION OF THE INVENTION

The solid titanium catalyst component for olefin polymerization, the process for preparation of the same, the olefin polymerization catalyst and the process for olefin polymerization according to the invention will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

FIGURE is an explanatory view showing steps of a process for preparing an olefin polymerization catalyst incuding an example of a process for preparing the solid titanium catalyst component [I] according to the invention.

First, the solid titanium catalyst component for olefin polymerization according to the invention is described.

[I] Solid Titanium Catalyst Component

The solid titanium catalyst component for olefin polymerization according to the invention comprises magnesium, titanium, halogen, and (C) a phthalic diester represented by the following structural formula (i):

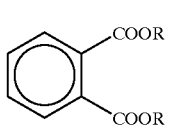

(wherein R is a branched hydrocarbon group of 7 carbon atoms, and two of R may be the same or different from each other).

The solid titanium catalyst component according to the invention preferably further comprises (D) an electron donor other than the phthalic diester in addition to the magnesium, titanium, halogen and (C) the phthalic diester represented by the above formula (i).

Details of these components will be described later.

In the solid titanium catalyst component for olefin polymerization according to the invention, magnesium is contained in an amount of 5 to 35% by weight, preferably 8 to 30% by weight, more preferably 10 to 28% by weight, particularly preferably 12 to 25% by weight;

titanium is contained in an amount of 0.3 to 10% by weight, preferably 0.5 to 8% by weight, more preferably 0.8 to 6% by weight, particularly preferably 1 to 5% by weight;

the halogen is contained in an amount of 30 to 75% by weight, preferably 35 to 75% by weight, more preferably 38 to 72% by weight, particularly preferably 40 to 70% by weight;

the phthalic diester (C) is contained in an amount of 0.5 to 30% by weight, preferably 1 to 27% by weight, more preferably 3 to 25% by weight, particularly preferably 5 to 23% by weight; and desirably The electron donor (D) other than the phthalic diester is further contained in an amount of 0.05 to 7% by weight, preferably 0.1 to 5% by weight, more preferably 0.15 to 4% by weight, particularly preferably 0.2 to 3% by weight.

In the solid titanium catalyst component, it is desired that an atomic ratio of halogen to titanium (halogen/titanium) is in the range of 2 to 200, preferably 4 to 90; an atomic ratio of magnesium to titanium (magnesium/titanium) is in the range of 1 to 100, preferably 2 to 50; and a molar ratio of phthalic diester (C) to titanium (phthalic diester (C)/titanium) is in the range of 0.01 to 100, preferably 0.05 to 50.

The solid titanium catalyst component according to the invention may contain hydrocarbon in an amount of 0.05 to 20% by weight, preferably 0.1 to 15% by weight, more preferably 0.3 to 12% by weight, particularly preferably 0.5 to 10% by weight.

When the amount of the hydrocarbon in the solid titanium catalyst component exceeds 20% by weight, agglomeration of the catalyst particles easily takes place. Consequently, particle properties of the catalyst sometimes deteriorate, and a polymer having poor particle properties might be obtained. Also in the case where the amount of the hydrocarbon is less than 0.05% by weight, the particle properties of the catalyst sometimes deteriorate. Moreover, the polymerization activity of the catalyst lowers, and a polymer of low stereoregularity might be obtained. In the use of such catalyst, further, a polymer of low bulk density might be obtained, and the amount of a fine powder (fine particle polymer) might be increased.

In addition to the above-mentioned components, the solid titanium catalyst component of the invention may further contain other components such as a carrier. These other components may be contained in amounts of not more than 50% by weight, preferably not more than 40% by weight, more preferably not more than 30% by weight, particularly preferably not more than 20% by weight.

The composition of the catalyst component can be determined as follows. The solid titanium catalyst component is thoroughly washed with a large amount of hexane, then dried at room temperature and 0.1 to 1 Torr for not shorter than 2 hours and measured on the composition by means of ICP (atomic absorption spectrometry), gas chromatography or the like.

There is no specific limitation on the process for preparing the solid titanium catalyst component of the invention, as far as the resulting component has the above-mentioned composition. The solid titanium catalyst component of the invention can be prepared using the following components.

(A) Magnesium Compound

The magnesium compound employable in the invention includes a magnesium compound having reduction ability (A-1) and a magnesium compound having no reduction ability (A-2).

The magnesium compound having reduction ability (A-1) is, for example, an organomagnesium compound represented by the following formula:

$$X_nMgR_{2-n}$$

wherein n is a number of $0 \leq n < 2$; R is hydrogen, an alkyl group of 1 to 20 carbon atoms, an aryl group or a cycloalkyl group; when n is 0, two of R may be the same as or different from each other; and X is halogen.

Examples of the organomagnesium compounds having reduction ability (A-1) include:

dialkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium;

alkylmagnesium halides, such as ethylmagnesium chloride, propylmagnesium chloride, butylmagnesium chloride, hexylmagnesium chloride and amylmagnesium chloride;

alkylmagnesium alkoxides, such as butylethoxymagnesium, ethylbutoxymagnesium and octylbutoxymagnesium; and other compounds, such as butylmagnesium hydride.

Examples of the magnesium compounds having no reduction ability (A-2) include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as ethoxymagnesium, isopropoxymagnesium, butoxymagnesium, n-octoxymagnesium and 2-ethylhexoxymagnesium;

aryloxymagnesiums, such as phenoxymagnesium and dimethylphenoxymagnesium; and magnesium carboxylates, such as magnesium laurate and magnesium stearate.

Also employable are magnesium metal and magnesium hydrides.

The magnesium compounds having no reduction ability (A-2) may be compounds derived from the aforementioned magnesium compounds having reduction ability (A-1) or compounds derived in the course of preparing a catalyst component. For deriving the magnesium compounds having no reduction ability from the magnesium compounds having reduction ability, for example, the magnesium compounds having reduction ability are brought into contact with polysiloxane compounds, halogen-containing silane compounds, halogen-containing aluminum compounds, esters, alcohols, halogen-containing compounds or compounds having OH group or active carbon-to-oxygen bond.

The magnesium compound having reduction ability or the magnesium compound having no reduction ability may be used as a complex or composite compound with another metal such as aluminum, zinc, boron, beryllium, sodium or potassium, or may be used as a-mixture with another metallic compound.

Such magnesium compounds as mentioned above may be used alone or in combination of two or more kinds.

In the invention, contact of the magnesium compound with a titanium compound which will be described later is carried out in the liquid state, and in this contact, the magnesium compound is preferably used in the form of a liquid. As the magnesium compound in the form of a liquid, a liquid magnesium compound may be used, or a solution of a solid magnesium compound in a solvent may be used.

If the magnesium compound is solid, it can be made to be in the form of a liquid using an electron donor (D-1).

Examples of the electron donor (D-1) include alcohols, phenols, ketones, aldehydes, ethers, amines, pyridines and metallic acid esters. More specifically, there can be mentioned:

alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols having 1 to 18 carbon atoms, such as trichloromethanol, trichloroethanol and trichlorohexanol;

phenols having 6 to 20 carbon atoms which may have a lower alkyl group, such as phenol, cresol, xylenol, ethylphenol, propylphenol, nonylphenol, cumylphenol and naphthol;

ketones having 3 to 15 carbon atoms, such as acetone, methyl ethyl ketone, methyl isobutyl ketone, ethyl n-butyl ketone, acetophenone, benzophenone, benzoquinone and cyclohexanone;

aldehydes having 2 to 15 carbon atoms, such as acetaldehyde, propionaldehyde, octylaldehyde, benzaldehyde, tolualdehyde and naphthaldehyde;

ethers having 2 to 20 carbon atoms, such as methyl ether, ethyl ether, isopropyl ether, butyl ether, amyl ether, tetrahydrofuran, ethylbenzyl ether, ethylene glycol dibutyl ether, anisole and diphenyl ether;

amines, such as trimethylamine, triethylamine, tributylamine, tribenzylamine and tetramethylethylenediamine;

pyridines, such as pyridine, methylpyridine, ethylpyridine and dimethylpyridine; and metallic acid esters, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium.

Of these, preferred are the alcohols and metallic acid esters, and particularly preferred are the alcohols having not less than 6 carbon atoms.

For example, when the magnesium compound is solubilized using the alcohols having not less than 6 carbon atoms, the alcohol is desirably used in an amount of about not less than 1 mol, preferably not less than 1.5 mol, based on 1 mol of the magnesium compound. The maximum amount of the alcohol is not particularly limited, but it is preferred that the maximum amount is not so large from the economical point of view, for example, the maximum amount of the alcohol is not more than 40 mol, based on 1 mol of the magnesium compound.

When the magnesium compound is solubilized using alcohols having not more than 5, the alcohol is required to be used in an amount of usually about not less than 15 mol, based on 1 mol of the magnesium compound.

In the present invention, the electron donors (D-1) exemplified as the solubilization agent for the solid magnesium compound are identical with the electron donors exemplified as (D) the electron donor other than phthalic diester which will be described later.

The solubilization reaction of the solid magnesium compound by the electron donor (D-1) is generally carried out by contacting the solid magnesium compound with the electron donor (D-1), followed by heating if necessary. In this process, the contact temperature is in the range of 0 to 200° C., preferably 20 to 180° C., more preferably 50 to 150° C.

The solubilization reaction may be carried out in the presence of a hydrocarbon solvent. Examples of the hydrocarbon solvents used herein include aliphatic hydrocarbons, such as pentane, hexane, heptane, octane, decane, dodecane, tetradecane and kerosine; alicyclic hydrocarbons, such as cyclopentane, methylcyclopentane, cyclohexane, methylcyclohexane, cyclooctane and cyclohexene; halogenated hydrocarbons, such as dichloroethane, dichloropropane, trichloroethylene and chlorobenzene; and aromatic hydrocarbons, such as benzene, toluene and xylene.

Though other magnesium compounds than those described above can be used for preparing the solid titanium catalyst component [I], preferably used is a magnesium compound which will be present in the form of a halogen-containing magnesium compound in the finally obtained solid titanium catalyst component [I]. Therefore, if a magnesium compound having no halogen is used, the magnesium compound is preferably contacted with a halogen-containing compound during the preparation of the catalyst component [I].

Of the above compounds, preferred are the magnesium compounds having no reduction ability, and particularly preferred are halogen-containing magnesium compounds. Above all, magnesium chloride, alkoxymagnesium chloride and aryloxymagnesium chloride are preferred.

(B) Titanium Compound

In the present invention, a tetravalent titanium compound is particularly preferably used as the titanium compound. The tetravalent titanium compound is, for example, a compound represented by the following formula:

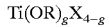

wherein R is a hydrocarbon group, X is a halogen atom, and $0 \leq g \leq 4$.

Examples of such compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(On-C_4H_9)Cl_3$, $Ti(OC_2H_5)Br_3$ and $Ti(O-iso-C_4H_9)Br_3$;

dialkoxytitanium dihalides, such as $Ti(OCH_3)_2Cl_2$, $Ti(OC_2H_5)_2Cl_2$, $Ti(On-C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(On-C_4H_9)_3Cl$ and $Ti(OC_2H_5)_3Br$; and tetraalkoxytitaniums, such as $Ti(OCH_3)_4$, $Ti(OC_2H_5)_4$, $Ti(On-C_4H_9)_4$, $Ti(O-iso-C_4H_9)_4$ and $Ti(O-2-ethylhexyl)_4$.

Of these, preferred are titanium tetrahalides, and particularly preferred is titanium tetrachloride. These titanium compounds may be used alone or in combination of two or more kinds. Further, these titanium compounds may be used by diluting them with such hydrocarbon solvents as used for the solubilization of the magnesium compound (A).

(C) Phthalic Diester

The phthalic diester (C) used in the invention is represented by the following structural formula (i):

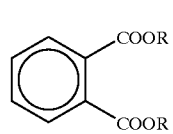

(i)

wherein R is a branched hydrocarbon group of 7 carbon atoms. Preferred is the branched hydrocarbon group of 7 carbon atoms having at least one branched methyl group. More preferred is the branched hydrocarbon group of 7 carbon atoms having one or two branched methyl groups. Two of R may be the same as or different from each other.

Examples of the phthalic diesters represented by the formula (i) include di(2-methylhexyl)phthalate, di(3-methylhexyl)phthalate, di(4-methylhexyl)phthalate, di(5-methylhexyl)phthalate, di(2,4-dimethylpentyl)phthalate and di(3,4-dimethylpentyl)phthalate.

In the above formula, the benzene nucleus may be substituted with halogen atoms or lower hydrocarbon groups.

In the above, examples of the compounds having the formula (i) wherein two of R groups are the same as each other are described, but compounds having different R groups are also employable. For example, compounds having two different branched alkyl groups in combination may be used.

The above-mentioned phthalic diesters may be used alone or in combination of two or more kinds.

As a combination of two or more kinds of the phthalic diesters, for example, the following mixture is preferably used in the invention.

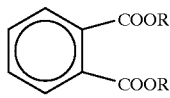

(R: 3-methylhexyl group=a %, 5-methylhexyl group=b %, 2,4-dimethylpentyl group=c %, a+b+c=100%)

In the present invention, it is enough that the phthalic diester (C) is contained in the finally obtained solid titanium catalyst component. Accordingly, the phthalic diester (C) does not always need to be per se used in the preparation of the solid titanium catalyst component, and it is possible to use compounds capable of producing the phthalic diester during the process for preparing the solid titanium catalyst component.

(D) Electron Donor

The solid titanium catalyst component of the invention preferably contains an electron donor (D) in addition to the phthalic diester (C).

As the electron donor (D) other than the phthalic diester, there can be employed alcohols, phenols, carboxylic acids, ketones, aldehydes, ethers, amines, pyridines and metallic acid esters, which are described above as the electron donor (D-1) used for preparing the magnesium compound (A) in the form of a liquid. Of these electron donors (D-1), preferred are the alcohols and metallic acid esters, and particularly preferred are the alcohols having not less than 6 carbon atoms.

The amount to the electron donor (D-1) is the same as in the solubilization of the magnesium compound (A).

In the present invention, it is preferred that electron donors (D-2) as described below are further used as the electron donor (D) for obtaining a solid titanium catalyst component having a uniform shape and a uniform particle size.

Preferred examples of the electron donor (D-2) include:

monocarboxylic esters, such as methyl formate, methyl acetate, ethyl acetate, vinyl acetate, propyl acetate, i-propyl acetate, i-butyl acetate, octyl acetate, cyclohexyl acetate, methyl chloroacetate, ethyl dichloroacetate, ethyl propionate, ethyl pyruvate, ethyl pivalate, methyl butyrate, ethyl valerate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, aliphatic carboxylic acids, such as formic acid, acetic acid, propionic acid, butyric acid and valeric acid;

acid anhydrides, such as acetic anhydride, phthalic anhydride, maleic anhydride, benzoic anhydride, trimellitic anhydride and tetrahydrophthalic anhydride;

ketones, such as acetone, methyl ethyl ketone, methyl isobutyl ketone, ethyl n-butyl ketone, acetophenone, benzophenone, benzoquinone and cyclohexanone;

ethers, such as methyl ether, ethyl ether, isopropyl ether, butyl ether, amyl ether, ethylbenzyl ether, ethylene glycol dibutyl ether, anisole, diphenylether, 2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane;

alkoxy group-containing alcohols, such as butyl cellosolve and ethyl cellosolve;

aliphatic carbonate, such as dimethyl carbonate, diethyl carbonate and ethylene carbonate;

organosilicon compounds, such as methyl silicate, ethyl silicate and diphenyldimethoxysilane, preferably organosilicon compounds represented by the formula $R^1_x R^2_y Si(OR^3)_z$ ($R^1$ and $R^2$ are each independently a hydrocarbon group or halogen, $R^3$ is a hydrocarbon group, $0 \leq x < 2$, $0 \leq y < 2$, and $0 < z \leq 4$); and organophosphorus compounds having P—O—C bond, such as trimethyl phosphite and triethyl phosphite.

The electron donor (D-2) is used in an amount of usually 0.01 to 1 mol, preferably 0.02 to 0.7 mol, more preferably 0.05 to 0.5 mol, based on 1 mol of the magnesium compound (A).

Preparation of Solid Titanium Catalyst Component

In the preparation of the solid titanium catalyst component, organic or inorganic compounds containing silicon, phosphorus, aluminum, etc., which are used as carriers or reaction assisting agents, may be used in addition to the above compounds.

Examples of the carriers include resins, such as $Al_2O_3$, $SiO_2$, $B_2O_3$, MgO, CaO, $TiO_2$, ZnO, $SnO_2$, BaO, ThO and a styrene-divinylbenzene copolymer. Of these, $Al_2O_3$, $SiO_2$ and a styrene-divinylbenzene copolymer are preferably used.

There is no specific limitation on the process for preparing the solid titanium catalyst component [I] using the above components, but some processes may be mentioned below.

In the preparation of the solid titanium catalyst component, the hydrocarbon is used at least once in any of the steps of the preparation process. As the hydrocarbon, the aforesaid hydrocarbon solvents used for preparing the magnesium compound (A) in the form of a liquid can be employed.

In the following processes for preparing the solid titanium catalyst, a step of preparing the magnesium compound (A) in the form of a liquid is also included.

In the following processes, further, an organometallic compound [II] which will be described later is used as the organometallic compound.

(1) A process comprising bringing a magnesium compound (A) in the form of a liquid consisting of a magnesium compound, the electron donor (D-1) and a hydrocarbon solvent into contact with the titanium compound (B) in the form of a liquid, after or simultaneously with precipitating a solid by bringing the magnesium compound (A) into contact with an organometallic compound.

In this process, the phthalic diester (C) is brought into contact with the contact product at least once.

(2) A process comprising bringing a contact product of an inorganic carrier and the liquid organomagnesium compound (A) into contact with the titanium compound (B) in the form of a liquid and the phthalic diester (C).

In this process, the contact product of the inorganic carrier and the liquid organomagnesium compound (A) may be preliminarily brought into contact with a halogen-containing compound and/or an organometallic compound.

(3) A process comprising preparing an inorganic or organic carrier on which a magnesium compound is supported from a mixture of an inorganic or organic carrier and the magnesium compound (A) in the form of a liquid consisting of a magnesium compound, the electron donor (D-1) and if necessary a hydrocarbon solvent, and then bringing the inorganic or organic carrier into contact with the titanium compound (B) in the form of a liquid.

In this process, the phthalic diester (C) is brought into contact with the contact product at least once.

(4) A process comprising bringing a solution containing a magnesium compound, the titanium compound (B) in the form of a liquid and if necessary the electron donor (D-1) and/or a hydrocarbon solvent into contact with an inorganic or organic carrier and the phthalic diester (C).

(5) A process comprising bringing the organomagnesium compound (A) in the form of a liquid into contact with the titanium compound (B) in the form of a liquid, and then bringing the contact product into contact with the phthalic diester (C).

(6) A process comprising bringing the organomagnesium compound (A) in the form of a liquid into contact with a halogen-containing compound, and then bringing the contact product into contact with the titanium compound (B) in the form of a liquid.

In this process, the phthalic diester (C) is used at least once.

(7) A process comprising bringing the alkoxy group-containing magnesium compound into contact with the titanium compound (B) in the form of a liquid and the phthalic diester (C).

(8) A process comprising bringing a hydrocarbon solution of a complex (magnesium compound (A) in the form of a liquid) consisting of an alkoxy group-containing magnesium compound and the electron donor (D-1) into contact with the titanium compound (B) in the form of a liquid and the phthalic diester (C).

(9) A process comprising bringing a liquid complex (magnesium compound (A) in the form of a liquid) consisting of an alkoxy group-containing magnesium compound and the electron donor (D-1) into contact with an organometallic compound, and then bringing the contact product into contact with the titanium compound (B) in the form of a liquid.

In this process, the phthalic diester (C) is brought into contact with the contact product at least once.

(10) A process comprising bringing the magnesium compound (A) having no reduction ability in the form of a liquid into contact with the titanium compound (B) in the form of a liquid in the presence or absence of the phthalic diester (C).

In this process, the phthalic diester (C) is brought into contact with the contact product at least once.

(11) A process comprising bringing a reaction product obtained by any of the processes (1) to (10) into contact with the titanium compound (B) in the form of a liquid.

(12) A process comprising bringing a reaction product obtained by any of the processes (1) to (10) into contact with the phthalic diester (C) and the titanium compound (B) in the form of a liquid.

(13) A process comprising contacting the magnesium compound (A) in the liquid state with the titanium compound (B) in the liquid state in the presence of at least one electron donor (D-2), and during or after the formation of a solid product, contacting the solid product with the phthalic diester (C).

(14) A process comprising contacting the solid titanium catalyst component prepared in the above process (13) with the titanium compound (B) in the liquid state.

In the preparation of the solid titanium catalyst component, the contact of the components is carried out at a temperature of usually −70 to 200° C., preferably −50 to 150° C., more preferably −30 to 100° C.

Specifically, in the process (13), the contact of the magnesium compound (A) with the titanium compound (B) in the liquid state is desirably carried out at a sufficiently low temperature, thereafter elevating the temperature to 60 to 120° C., preferably 80 to 100° C., more preferably 85 to 95° C., most preferably 87 to 93, and thereafter keeping this temperature, and in the process (14), the further contact of the titanium catalyst component prepared as described above with the titanium compound (B) in the liquid state is desirably carried out at 85 to 95° C., preferably 87 to 93° C.

The amounts of the components used for preparing the solid titanium catalyst component vary according to the process used, and cannot be defined generally. However, for example, the phthalic diester (C) is used in an amount of 0.01 to 1.0 mol, preferably 0.05 to 0.5 mol, more preferably 0.1 to 0.5 mol, based on 1 mol of the magnesium compound, and the titanium compound (B) in the form of a liquid is used in an amount of 0.01 to 1,000 mol, preferably 0.1 to 200 mol, based on 1 mol of the magnesium compound.

The solid titanium catalyst component of the invention obtained above contains titanium, magnesium, halogen and the phthalic diester (C), and preferably further contains the electron donor (D) in the amounts described hereinbefore.

Of the above processes, the processes (13) and (14) are preferred for preparing the solid titanium catalyst component containing magnesium, titanium, halogen, the phthalic diester (C) and the electron donor (D)

The processes (13) and (14) will be described below in more detail.

In the processes (13) and (14), when the solid product is obtained by contacting the magnesium compound (A) with the titanium compound (B) in the liquid state, it is possible to contact a hydrocarbon solution of the magnesium compound (A) with the titanium compound (B) in the form of a liquid to prepare the solid product, or it is also possible to initially prepare a hydrocarbon solution of the magnesium compound (A) and the titanium compound (B), followed by forming the solid product.

In the processes (13) and (14), as the electron donor (D), the electron donors (D-1) and (D-2) are preferably used. For example, the process (14) in which the halogen-containing magnesium as the magnesium compound (A) and the alcohols having not less than 6 carbon atoms as the electron donor (D-1) are used will be described below in more detail.

Firstly, the halogen-containing magnesium compound (A) is brought into contact with the alcohols (D-1) having not less than 6 carbon atoms in the hydrocarbon solvent to prepare a homogeneous solution (a magnesium compound solution) dissolving the halogen-containing magnesium (A) in a mixed solvent of the alcohols and hydrocarbon.

In this step, the alcohol is used in an amount of usually 1 to 40 mol, preferably 1.5 to 20 mol, based on 1 mol of the magnesium compound, and the hydrocarbon solvent is used in an amount of usually 1 to 30 mol, preferably 1.5 to 15 mol, based on 1 mol of the magnesium compound. The contact of components is carried out at a temperature of 65 to 300° C., preferably 10 to 200° C.

Then, the magnesium compound solution is brought into contact with the electron donor (D-2) to prepare a homogeneous magnesium-electron donor (D-2) solution.

In this step, the electron donor (D-2) is used in an amount of usually 0.01 to 1.0 mol, preferably 0.02 to 0.7 mol, based on 1 mol of the magnesium compound. The contact of components is carried out at a temperature of −20 to 300° C., preferably 20 to 200° C., for 5 to 240 minutes, preferably 10 to 120 minutes.

Then, the above-prepared magnesium-electron donor (D-2) solution is brought into contact with the titanium compound (B) in the form of a liquid to prepare a magnesium-titanium mixed solution.

In this step, the titanium compound (B) is used in an amount of usually 2 to 100 g atom, preferably 4 to 50 g atom, based on 1 g atom of magnesium.

The contact of the magnesium-electron donor (D-2) solution with the titanium compound (B) in the form of a liquid is desirably carried out at −30 to 50° C., preferably at −25 to 20° C., over 0.2 to 4.0 hours, preferably over 0.5 to 2.0 hours, then elevating the temperature over 0.5 to 6 hours, preferably over 1.5 to 4 hours, to 85 to 95° C., preferably to 87 to 93° C., and thereafter keeping the temperature for 0.5 to 6 hours, preferably 1 to 4 hours.

When the further contact of the titanium catalyst component prepared as described above with the titanium compound (B) in the form of a liquid is carried out at 85 to 95° C., preferably at 87 to 93° C., over 1 to 6 hours, preferably 1 to 4 hours, a solid titanium catalyst component having a high activity can be obtained.

The phthalic diester (C) is preferably added to the catalyst system during the elevation of the temperature, preferably at the time when the temperature reaches the above range or thereafter.

In this step, the phthalic diester (C) is used in an amount of 0.01 to 1.0 mol, preferably 0.05 to 0.5 mol, more preferably 0.1 to 0.5 mol based on 1 mol of the magnesium compound. The contact after adding the phthalic diester (C) is carried out for 5 to 300 minutes, preferably 30 to 180 minutes.

Olefin Polymerization Catalyst

The olefin polymerization catalyst according to the invention comprises:

[I] the above-mentioned solid titanium catalyst component,

[II] an organometallic compound catalyst component, and

[III] an electron donor.

[II] Organometallic Compound Catalyst Component

The organometallic compound catalyst component used in the invention is preferably an organometallic compound containing a metal selected from metals of Group I to Group III of the periodic table. Examples of such compounds include organoaluminum compounds, alkyl complex compounds of Group I metals and aluminum and organometallic compounds of Group II metals.

The organoaluminum compound is, for example, an organoaluminum compound represented by the following formula:

$$R^a_n AlX_{3-n}$$

wherein $R^a$ is a hydrocarbon group of 1 to 12 carbon atoms, X is halogen or hydrogen, and n is 1 to 3.

In the above formula, $R^a$ is a hydrocarbon group of 1 to 12 carbon atoms, for example, an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichoride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound is a compound represented by the following formula:

$$R^a_n AlY_{3-n}$$

wherein $R^a$ is the same as above; Y is —$OR^b$ group, —$OSiR^c_3$ group, —$OAlR^d_2$ group, —$NR^e_2$ group, —$SiR^f_3$ group or —$N(R^g)AlR^h_2$ group; n is 1 to 2; $R^b, R^c, R^d$ and $R^h$ are each methyl, ethyl, isopropyl, isobutyl, cyclohexyl, phenyl or the like, $R^e$ is hydrogen, methyl, ethyl, isopropyl, phenyl, trimethylsilyl or the like; and $R^f$ and $R^g$ are each methyl, ethyl or the like.

Examples of such organoaluminum compounds include:

(i) compounds of the formula $R^a_n Al(OR^b)_{3-n}$, e.g., dimethylaluminum methoxide, diethylaluminum ethoxide and diisobutylaluminum methoxide;

(ii) compounds of the formula $R^a_n Al(OSiR^c)_{3-n}$, e.g., $Et_2Al(OSiMe_3)$, $(iso-Bu)_2Al(OSiMe_3)$ and $(iso-Bu)_2Al(OSiEt_3)$;

(iii) compounds of the formula $R^a_n Al(OAlR^d_2)_{3-n}$, e.g., $Et_2AlOAlEt_2$ and $(iso-Bu)_2AlOAl(iso-Bu)_2$;

(iv) compounds of the formula $R^a_n Al(NR^e_2)_{3-n}$, e.g., $Me_2AlNEt_2$, $Et_2AlNHMe$, $Me_2AlNHEt$, $Et_2AlN(Me_3Si)_2$ and $(iso-Bu)_2AlN(Me_3Si)_2$;

(v) compounds of the formula $R^a_n Al(SiR^f_2)_{3-n}$, e.g., $(iso-Bu)_2AlSiMe_3$; and (vi) compounds of the formula $R^a_n Al[N(R^g)AlR^h_2]_{3-n}$, e.g., $Et_2AlN(Me)-AlEt_2$ and $(iso-Bu)_2AlN(Et)Al(iso-Bu)_2$.

Further, compounds analogous to the above compounds, for example, organoaluminum compounds in which two or more aluminum atoms are linked through an oxygen atom or a nitrogen atom can be employed. Particular examples of such compounds include $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$.

Moreover, aluminoxane such as methylaluminoxane can be also employed.

Of the organoaluminum compounds mentioned above, preferred are organoaluminum compounds represented by the formulas $R^a_3Al$, $R^a_n Al(OR^b)_{3-n}$ and $R^a_n Al(OAlR^d_2)_{3-n}$.

The alkyl complex compound of Group I metal and aluminum is, for example, a compound represented by the following formula:

M¹AlR'₄ wherein M¹ is Li, Na or K, and R' is a hydrocarbon group of 1 to 15 carbon atoms.

Particular examples of such compounds include LiAl(C₂H₅)₄ and LiAl(C₇H₁₅)₄.

The organometallic compound of Group II metal is, for example, a compound represented by the following formula:

R^k R¹ M² wherein R^k and R¹ are each a hydrocarbon group of 1 to 15 carbon atoms or halogen, R^k and R¹ may be the same as or different from each other with the exception that both of them are halogens, and M² is Mg, Zn or Cd.

Particular examples of such compounds include diethylzinc, diethylmagnesium, butylethylmagnesium, ethylmagnesium chloride and butylmagnesium chloride.

The compounds mentioned above may be used alone or in combination of two or more kinds.

[III] Electron Donor

As the electron donor [III] used for forming the olefin polymerization catalyst, the aforesaid electron donor (D) can be employed in the invention. Also employable is an organosilicon compound represented by the following formula:

R_n Si(OR')_{4−n} wherein R and R' are each a hydrocarbon group, and 0<n<4.

Examples of the organosilicon compounds represented by the above formula include:

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxyethoxysilane), vinyltriacetoxysilane and dimethyltetraethoxydisiloxane; cyclopentyltrimethoxysilane, 2-methylcyclopentyltrimethoxysilane, 2,3-dimethylcyclopentyltrimethoxysilane and cyclopentyltriethoxysilane; dicyclopentyldimethoxysilane, bis(2-methylcyclopentyl) dimethoxysilane, bis(2,3-dimethylcyclopentyl) dimethoxysilane and dicyclopentyldiethoxysilane; and tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane and cyclopentyldimethylethoxysilane.

Of these, preferably used are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

In the invention, a compound having two or more ether linkages present through plural atoms (hereinafter sometimes referred to as ("polyether") can be also employed as the electron donor [III].

The polyether is, for example, a compound which has two or more atoms selected from carbon, silicon, oxygen, nitrogen, phosphorus, boron and sulfur as the atoms present between the ether linkages. Of such compounds, preferred are compounds in which relatively bulky substituents are bonded to the atoms present between the ether linkages and the atoms present between the two or more ether linkages include plural carbon atoms.

For example, preferred is a polyether represented by the following formula:

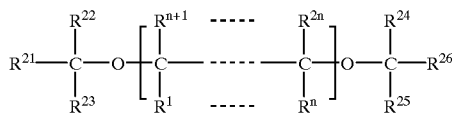

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon, an arbitrary combination of $R^1$ to $R^{26}$, preferably $R^1$ to $R^{2n}$, may form a ring other than a benzene ring in cooperation, and the main chain may contain an atom other than carbon.

Listed below are examples of the polyether compounds.
2-(2-Ethylhexyl)-1,3-dimethoxypropane,
2-Isopropyl-1,3-dimethoxypropane,
2-Butyl-1,3-dimethoxypropane,
2-s-Butyl-1,3-dimethoxypropane,
2-Cyclohexyl-1,3-dimethoxypropane,
2-Phenyl-1,3-dimethoxypropane,
2-Cumyl-1,3-dimethoxypropane,
2-(2-Phenylethyl)-1,3-dimethoxypropane, 2-(2-Cyclohexylethyl)-1,3-dimethoxypropane,
2-(p-Chlorophenyl)-1,3-dimethoxypropane,
2-(Diphenylmethyl)-1,3-dimethoxypropane,
2-(1-Naphthyl)-1,3-dimethoxypropane,
2-(2-Fluorophenyl)-1,3-dimethoxypropane,
2-(1-Decahydronaphthyl)-1,3-dimethoxypropane,
2-(p-t-Butylphenyl)-1,3-dimethoxypropane,
2,2-Dicyclohexyl-1,3-dimethoxypropane,
2,2-Diethyl-1,3-dimethoxypropane,
2,2-Dipropyl-1,3-dimethoxypropane,
2,2-Dibutyl-1,3-dimethoxypropane,
2-Methyl-2-propyl-1,3-dimethoxypropane,
2-Methyl-2-benzyl-1,3-dimethoxypropane,
2-Methyl-2-ethyl-1,3-dimethoxypropane,
2-Methyl-2-isopropyl-1,3-dimethoxypropane,
2-Methyl-2-phenyl-1,3-dimethoxypropane,
2-Methyl-2-cyclohexyl-1,3-dimethoxypropane,
2,2-Bis(p-chlorophenyl)-1,3-dimethoxypropane,
2,2-Bis(2-cyclohexylethyl)-1,3-dimethoxypropane,
2-Methyl-2-isobutyl-1,3-dimethoxypropane,
2-Methyl-2-(2-ethylhexyl)-1,3-dimethoxypropane,
2,2-Diisobutyl-1,3-dimethoxypropane,
2,2-Diphenyl-1,3-dimethoxypropane,
2, 2-Dibenzyl-1,3-dimethoxypropane,
2,2-Bis(cyclohexylmethyl)-1,3-dimethoxypropane,
2,2-Diisobutyl-1,3-diethoxypropane,
2,2-Diisobutyl-1,3-dibutoxypropane,
2-Isobutyl-2-isopropyl-1,3-dimethoxypropane,
2,2-Di-s-butyl-1,3-dimethoxypropane,
2,2-Di-t-butyl-1,3-dimethoxypropane,
2,2-Dineopentyl-1,3-dimethoxypropane,
2-Isopropyl-2-isopentyl-1,3-dimethoxypropane,
2-Phenyl-2-benzyl-1,3-dimethoxypropane,
2-Cyclohexyl-2-cyclohexylmethyl-1,3-dimethoxypropane,
2,3-Diphenyl-1,4-diethoxybutane,
2,3-Dicyclohexyl-1,4-diethoxybutane,
2,2-Dibenzyl-1,4-diethoxybutane,
2,3-Dicyclohexyl-1,4-diethoxybutane,
2,3-Diisopropyl-1,4-diethoxybutane,
2,2-Bis(p-methylphenyl)-1,4-dimethoxybutane,
2,3-Bis(p-chlorophenyl)-1,4-dimethoxybutane,
2,3-Bis(p-fluorophenyl)-1,4-dimethoxybutane,
2,4-Diphenyl-1,5-dimethoxypentane,
2,5-Diphenyl-1,-5-dimethoxyhexane,
2,4-Diisopropyl-1,5-dimethoxypentane,
2,4-Diisobutyl-1,5-dimethoxypentane,
2,4-Diisoamyl-1,5-dimethoxypentane,
3-Methoxymethyltetrahydrofuran,
3-Methoxymethyldioxane,
1,2-Diisobutoxypropane,
1,2-Diisobutoxyethane,
1,3-Diisoamyloxyethane,
1,3-Diisoamyloxypropane,
1,3-Diisoneopentyloxyethane,
1,3-Dineopentyloxypropane,
2,2-Tetramethylene-1,3-dimethoxypropane,
2,2-Pentamethylene-1,3-dimethoxypropane,
2,2-Hexamethylene-1,3-dimethoxypropane,
1,2-Bis(methoxymethyl)cyclohexane,
2,8-Dioxaspiro[5,5]undecane,
3,7-Dioxabicyclo[3,3,1]nonane,
3,7-Dioxabicyclo[3,3,0]octane,
3,3-Diisobutyl-1,5-oxononane,
6,6-Diisobutyloxyheptane,
1,1-Dimethoxymethylcyclopentane,
1,1-Bis(dimethoxymethyl)cyclohexane,
1,1-Bis(methoxymethyl)bicyclo[2,2,1]heptane,
1,1-Dimethoxymethylcyclopentane,
2-Methyl-2-methoxymethyl-1,3-dimethoxypropane,
2-Cyclohexyl-2-ethoxymethyl-1,3-diethoxypropane,
2-Cyclohexyl-2-methoxymethyl-1,3-dimethoxypropane,
2,2-Diisobutyl-1,3-dimethoxycyclohexane,
2-Isopropyl-2-isoamyl-1,3-dimethoxycyclohexane,
2-Cyclohexyl-2-methoxymethyl-1,3-dimethoxycyclohexane,
2-Isopropyl-2-methoxymethyl-1,3-dimethoxycyclohexane,
2-Isobutyl-2-methoxymethyl-1,3-dimethoxycyclohexane,
2-Cyclohexyl-2-ethoxymethyl-1,3-diethoxycyclohexane,
2-Cyclohexyl-2-ethoxymethyl-1,3-dimethoxycyclohexane,
2-Isopropyl-2-ethoxymethyl-1,3-diethoxycyclohexane,
2-Isopropyl-2-ethoxymethyl-1,3-dimethoxycyclohexane,
2-Isobutyl-2-ethoxymethyl-1,3-diethoxycyclohexane,
2-Isobutyl-2-ethoxymethyl-1,3-dimethoxycyclohexane,
Tris(p-methoxyphenyl)phosphine,
Methylphenylbis(methoxymethyl)silane,
Diphenylbis(methoxymethyl)silane,
Methylcyclohexylbis(methoxymethyl)silane,
Di-t-butylbis(methoxymethyl)silane,
Cyclohexyl-t-butylbis(methoxymethyl)silane, and
i-Propyl-t-butylbis(methoxymethyl)silane.

Of these, preferred are 2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

Also employable as the electron donor [III] are:
nitrogen-containing electron donors, such as 2,6-substituted piperidines, 2,5-substituted piperidines, substituted methylenediamines (e.g., N,N,N',N'-tetramethylmethylenediamine and N,N,N',N'-tetraethylmethylenediamine) and substituted imidazolidines (e.g., 1,3-dibenzylimidazolidine and 1,3-dibenzyl-2-phenylimidazolidine);
phosphorus-containing electron donors, such as phosphites (e.g., triethyl phosphite, tri-n-propyl phosphite, tri-isopropyl phosphite, tri-n-butyl phosphite, triisobutyl phosphite, diethyl-n-butyl phosphite and diethylphenyl phosphite); and
oxygen-containing electron donors, such as 2,6-substituted tetrahydropyrans and 2,5-substituted tetrahydropyrans.

The electron donors [III] mentioned above may be used alone or in combination of two or more kinds.

Prepolymerized Catalyst

The olefin polymerization catalyst of the invention may be prepolymerized. The prepolymerized catalyst can be obtained by pre(co)polymerizing olefins, polyenes, etc. in the presence of the solid titanium catalyst component [I], the organometallic compound catalyst component [II] and if necessary the electron donor [III].

In the invention, there is no specific limitation on the process for prepolymerization. For example, the prepolymerization can be carried out in the presence of an inert solvent described later. In this case, it is preferred to add olefins and the catalyst components to the inert solvent and to conduct the prepolymerization under mild conditions. The prepolymerization may be carried out under such conditions that the resulting prepolymer is dissolved in the polymerization medium, or may be carried out under such conditions that the resulting prepolymer is not dissolved therein. Preferably, the prepolymerization is carried out under such conditions that the resulting prepolymer is not dissolved in the polymerization medium.

Examples of the olefins used in the prepolymerization include α-olefins of 2 or more carbon atoms, for example, ethylene, propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. These olefins may be used alone or in combination of two or more kinds.

The α-olefins used in the prepolymerization may be the same as or different from α-olefins used in the polymerization described later.

Examples of the polyene compounds include:
aliphatic polyene compounds, such as 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene and 6-methyl-1,6-undecadiene, 1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene, butadiene and isoprene;
alicyclic polyene compounds, such as vinylcyclohexane, vinylnorbornene, ethylidenenorbornene, dicyclopentadiene, cyclooctadiene and 2,5-norbornadiene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane and 1-isopropenyl-3-vinylcyclopentane; and
aromatic polyene compounds, such as divinylbenzene and vinylisopropenylbenzene.

Also employable are:
aromatic vinyl compounds, such as styrene, substituted styrenes, allylbenzene, substituted allybenzenes, vinylnaphthalenes, substituted vinylnaphthalenes, allylnaphthalenes and substituted allylnaphthalenes;
alicyclic vinyl compounds, such as vinylcyclopentane, substituted vinylcyclopentanes, vinylcyclohexane, substituted vinylcyclohexanes, vinylcycloheptane, substituted vinylcyclcoheptanes and allylnorbornane;
cycloolefins, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene; and
unsaturated silane compounds, such as allyltrimethylsilane, allyltriethylsilane, 4-trimethylsilyl-1-butene, 6-trimethylsilyl-1-hexene, 8-trimethylsilyl-1-octene and 10-trimethylsilyl-1-decene.

Of these, preferably used are ethylene, propylene, 1-butene, 1-eicosene, 3-methyl-1-butene, 3-methyl-1-pentene, 4-methyl-1-pentene, vinylcyclohexane, dimethylstyrene, allyltrimethylsilane and allylnaphthalene.

Examples of the inert solvents include aliphatic hydrocarbons, such as propane, butane, pentane, hexane, haptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride and chlorobenzene. These solvents may be used alone or in combination.

Of the above inert solvents, particularly preferred are aliphatic hydrocarbons.

In the invention, the prepolymerization may be carried out under such conditions that the olefins or polyenes become liquid, or may be carried out under gas phase conditions.

The prepolymerization can be conducted either batchwise, semicontinuously or continuously.

The catalyst concentration in the prepolymerization system may be higher than the catalyst concentration in the polymerization system.

Concentrations of the catalyst components in the prepolymerization vary depending upon the catalyst components used, but the concentration of the solid titanium catalyst component [I] is desired to be in the range of usually about 0.001 to 5,000 mmol, preferably about 0.01 to 1,000 mmol, particularly preferably 0.1 to 500 mmol, based on 1 liter of the polymerization volume.

The organometallic compound catalyst component [II] is desirably used in such an amount that a pre(co)polymer is produced in an amount of 0.01 to 2,000 g, preferably 0.03 to 1,000 g, more preferably 0.05 to 200 g, based on 1 g of the solid titanium catalyst component [I]. That is, the organometallic compound catalyst component [II] is used in an amount of usually about 0.1 to 1,000 mol, preferably about 0.5 to 500 mol, particularly preferably 1 to 100 mol, based on 1 mol of titanium in the solid titanium catalyst component.

In the prepolymerization, the electron donor [III] can be used, if necessary, in an amount of 0.01 to 50 mol, preferably 0.05 to 30 mol, more preferably 0.1 to 10 mol, based on 1 mol of the titanium atom in the solid titanium catalyst component [I].

The prepolymerization is desirably conducted at a temperature of usually about −20 to +100° C., preferably about −20 to +80° C., more preferably about −10 to 40° C.

In the prepolymerization, a molecular weight regulator such as hydrogen can be used.

When the prepolymerized catalyst obtained as above is in the form of a suspension, this prepolymerized catalyst in the form of a suspension may be used as it is in the subsequent polymerization, or the prepolymerized catalyst may be used after separated from the suspension.

The prepolymerized catalyst obtained as above generally forms an olefin polymerization catalyst together with the organometallic compound catalyst component [II] and the electron donor [III], but the prepolymerized catalyst can be used alone as the olefin polymerization catalyst.

The olefin polymerization catalyst of the invention may further contain other components useful for the olefin polymerization than the above-described components.

Process for Olefin Polymerization

In the process for olefin polymerization (main polymerization) according to the invention, an olefin is polymerized or copolymerized in the presence of the olefin polymerization catalyst comprising the solid titanium catalyst component [I], the organometallic compound catalyst component [II] and the electron donor [III] or in the presence of the olefin polymerization catalyst further containing a prepolymerized catalyst.

Examples of the olefins used herein include the same α-olefins of two or more carbon atoms, polyene compounds, vinyl compounds and unsaturated compounds as used in the prepolymerization. They are used alone or in combination.

Of these, preferably used are ethylene, propylene, 1-butene, 3-methyl-1-butene, 3-methyl-1-pentene, 4-methyl-1-pentene, vinylcyclohexane, dimethylstyrene, allyltrimethylsilane and allylnaphthalene.

The polymerization can be carried out by any of a liquid phase polymerization process such as solution polymerization process or suspension polymerization process and a gas phase polymerization process.

When the polymerization is carried out by a slurry polymerization process, the aforesaid inert organic solvent can be used as a reaction solvent, or an olefin which is liquid at the reaction temperature can be used as a reaction solvent.

In the process for olefin polymerization according to the invention, the solid titanium catalyst component [I] or the prepolymerized catalyst is desirably used in an amount of usually about 0.001 to 100 mmol, preferably about 0.005 to 20 mmol, in terms of the titanium atom, based on 1 liter of the polymerization volume. The organometallic compound catalyst component [II] is desirably used in such an amount that the amount of the metal atom in the catalyst component [II] is in the range of usually about 1 to 2,000 mol, preferably about 2 to 500 mol, based on 1 mol of the titanium atom in the solid titanium catalyst component [I] in the polymerization system.

The electron donor [III] is desirably used in an amount of usually about 0.001 to 10 mol, preferably 0.01 to 5 mol, based on 1 mol of the metal atom in the organometallic compound catalyst component [II].

If hydrogen is used in the polymerization, the molecular weight of the resulting polymer can be regulated, and a polymer having a high melt flow rate can be obtained.

In the process of the invention, the polymerization conditions vary depending on the olefin used, but generally the polymerization is carried out under the following conditions.

That is, the polymerization is carried out at a temperature of usually about 20 to 300° C., preferably about 50 to 150° C., under a pressure of atmospheric pressure to 100 kg/cm$^2$, preferably about 2 to 50 kg/cm$^2$.

In the process of the invention, the polymerization can be conducted either batchwise, semicontinuously or continuously. Further, the polymerization can be conducted in two or more stages having different reaction conditions.

In the polymerization, an olefin homopolymer may be prepared, or a random copolymer or a block copolymer may be prepared from two or more kinds of olefins.

When the process for olefin polymerization is carried out using the olefin polymerization catalyst as described above, an olefin polymer having high stereoregularity can be obtained with prominently high polymerization activity.

The olefin polymer prepared by the process of the invention desirably has a melt flow rate (MFR), measured in accordance with ASTM D1238E, of not more than 5,000 g/10 min, preferably 0.01 to 3,000 g/10 min, more preferably 0.02 to 2,000 g/10 min, particularly preferably 0.05 to 1,000 g/10 min.

The olefin polymer desirably has an intrinsic viscosity [η], as measured in decalin at 135° C., of 0.05 to 20 dl/g, preferably 0.1 to 15 dl/g, particularly preferably 0.2 to 13 dl/g.

The olefin polymer obtained by the process of the invention may further contain various additives such as heat stabilizer, weathering stabilizer, antistatic agent, antiblocking agent, lubricant, nucleating agent, pigment, dye and inorganic or organic filler, if necessary.

EFFECT OF THE INVENTION

According to the invention, there is provided a solid titanium catalyst component for olefin polymerization by which an olefin polymer having high stereoregularity can be prepared in a prominently high yield per catalyst unit. Also provided are a process for preparing said solid titanium catalyst, an olefin polymerization catalyst containing said solid titanium catalyst component and a process for olefin polymerization using said olefin polymerization catalyst.

EXAMPLE

The present invention will be further described with reference to the following examples, but it should be construed that the invention is in no way limited to those examples.

In the following examples, the total polymer (II (t-I.I.)) was calculated in accordance with the following equation.

$$t - I.I. = \frac{\text{Yield of powdered polymer (g)} \times \frac{\text{Boiling heptane extraction residue (\%)}}{100}}{\text{Yield of powdered polymer (g)} + \text{Yield of polymerization solvent soluble polymer (g)}} \times 100$$

Example 1
[Preparation of Solid Titanium Catalyst Component (A)]

A homogeneous solution was prepared by reacting 95.2 g of anhydrous magnesium chloride with 442 ml of decane and 390.6 g of 2-ethylhexyl alcohol under heating at 130° C. for 3 hours. To the solution, 22.2 g of phthalic anhydride was added, and they were stirred at 130° C. for 1 hour to dissolve phthalic anhydride in the solution.

The homogeneous solution thus obtained was cooled to room temperature. Then, 57 ml of the solution was dropwise added to 150 ml of titanium tetrachloride kept at −20° C., over a period of 1 hour. After the addition was completed, the temperature of the resulting mixture was elevated to 90° C. over a period of 4 hours. When the temperature reached 90° C., 6.2 ml of diheptyl phthalate having the following structure was added, followed by stirring at the same temperature for 2 hours.

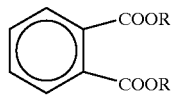

(R: 3-methylhexyl group=63%, 5-methylhexyl group=30%, 2,4-dimethylpentyl group=7%)

After the 2-hour reaction was completed, a solid portion was recovered by hot filtration. The solid portion was resuspended in 200 ml of titanium tetrachloride, and the reaction was further conducted under heating at 90° C. for 2 hours.

After the reaction was completed, a solid portion was recovered again by hot filtration. The solid portion was washed with decane of 90° C., and then further washed sufficiently with hexane at room temperature until any titanium compound liberated in the solution was not detected.

The solid titanium catalyst component (A) prepared through the above operation was stored in the form of a decane slurry, and a part of it was dried for the purpose of examining composition thereof.

In the solid titanium catalyst component (A) thus obtained, 2.3% by weight of titanium, 18% by weight of magnesium, 57% by weight of chlorine, 16.2% by weight of diheptyl phthalate, 6.4% by weight of decane and 0.2% by weight of 2-ethylhexanol (2-ethylhexyl group) were contained.

[Polymerization]

To a 2-liter autoclave was introduced 750 ml of purified n-hexane, and were further introduced 0.75 mmol of triethylaluminum, 0.075 mmol of cyclohexylmethyldimethoxysilane (CMMS) and 0.0075 mmol (in terms of Ti atom) of the solid titanium catalyst component (A) at 40° C. in a propylene atmosphere.

To the autoclave was furthermore added 200 ml of hydrogen at 60° C. Then, the temperature of the system was elevated to 70° C. and kept at the same temperature for 2 hours to perform polymerization of propylene. The pressure was kept at 7 kg/cm$^2$-G during the polymerization.

After the polymerization was completed, the resulting slurry containing a solid produced was filtered to separate the slurry into a white powder and a liquid portion.

The yield of the white powdery polymer after drying was 257.2 g, and the boiling heptane extraction residue (II) was 97.60%. This polymer had MFR of 4.5 g/10 min, an apparent bulk specific gravity of 0.44 g/ml and a melting point, as measured by DSC, of 160.7° C. Separately, the liquid portion was concentrated to obtain 1.6 g of a solvent-soluble polymer. Accordingly, the activity was 34,500 g-PP/mmol-Ti and 15,100 g-PP/g-Cat, and II (t-I.I.) in the whole polymer was 97.0%.

The results are set forth in Table 1.

Comparative Example 1

[Preparation of Solid Titanium Catalyst Component (B)]

A homogeneous solution was prepared by reacting 95.2 g of anhydrous magnesium chloride with 442 ml of decane and 390.6 g of 2-ethylhexyl alcohol under heating at 130° C. for 3 hours. To the solution, 22.2 g of phthalic anhydride was added, and they were stirred at 130° C. for 1 hour to dissolve phthalic anhydride in the solution.

The homogeneous solution thus obtained was cooled to room temperature. Then, 57 ml of the solution was dropwise added to 150 ml of titanium tetrachloride kept at −20° C., over a period of 1 hour. After the addition was completed, the temperature of the resulting mixture was elevated to 100° C. over a period of 4 hours. When the temperature reached 100° C., 6.2 ml of the same diheptyl phthalate as used in Example 1 was added, followed by stirring at the same temperature for 2 hours.

After the 2-hour reaction was completed, a solid portion was recovered by hot filtration. The solid portion was resuspended in 200 ml of titanium tetrachloride, and the reaction was further conducted under heating at 100° C. for 2 hours.

After the reaction was completed, a solid portion was recovered again by hot filtration. The solid portion was washed with decane of 100° C., and then further washed sufficiently with hexane at room temperature until any titanium compound liberated in the solution was not detected. The solid titanium catalyst component (B) prepared through the above operation was stored in the form of a decane slurry, and a part of it was dried for the purpose of examining composition thereof.

In the solid titanium catalyst component (B) thus obtained, 2.1% by weight of titanium, 58% by weight of chlorine, 19% by weight of magnesium, 11.8% by weight of diheptyl phthalate, 8.9% by weight of decane and 0.2% by weight of 2-ethylhexanol (2-ethylhexyl group) were contained.

[Polymerization]

Polymerization of propylene was carried out in the same manner as described in Example 1 except that the solid titanium catalyst component (B) was used in place of the solid titanium catalyst component (A).

The results are set forth in Table 1.

Example 2

[Preparation of Solid Titanium Catalyst Component (C)]

A solid titanium catalyst component (C) was prepared in the same manner as described in Example 1 except that diheptyl phthalate was added in an amount of 5.1 ml.

In the solid titanium catalyst component (C) thus obtained, 2.3% by weight of titanium, 18% by weight of magnesium, 58% by weight of chlorine, 15.5% by weight of diheptyl phthalate, 6.1% by weight of decane and 0.1% by weight of 2-ethylhexanol (2-ethylhexyl group) were contained.

[Polymerization]

Polymerization of propylene was carried out in the same manner as described in Example 1 except that the solid titanium catalyst component (C) was used in place of the solid titanium catalyst component (A).

The results are set forth in Table 1.

Comparative Example 2

[Prepolymerization of Solid Titanium Catalyst Component (B)]

To a 400-ml four-necked glass reactor equipped with a stirrer were introduced 100 ml of purified hexane, 3 mmol of triethylaluminum and 1.0 mmol (in terms of Ti atom) of the solid titanium catalyst component (B). Then, to the reactor was fed propylene at a feed rate of 3.7 l/hr for 1 hour. The polymerization temperature was kept at 20° C.

After feeding of propylene was completed, the reactor was purged with nitrogen, and a washing operation consisting of removal of a supernatant liquid and addition of purified hexane was repeated twice. The product was resuspended in purified decane, and the whole suspension was transferred into a catalyst bottle to obtain a prepolymerized catalyst (D).

[Polymerization]

To a 2-liter autoclave was introduced 750 ml of purified n-hexane, and were further introduced 0.75 mmol of triethylaluminum, 0.075 mmol of cyclohexylmethyldimethoxysilane (CMMS) and 0.0075 mmol (in terms of Ti atom) of the prepolymerized catalyst (D) at 60° C. in a propylene atmosphere.

To the autoclave was furthermore added 200 ml of hydrogen. Then, the temperature of the system was elevated to 70° C. and kept at the same temperature for 2 hours to perform polymerization of propylene. The pressure was kept at 7 kg/cm$^2$-G during the polymerization.

The results are set forth in Table 1.

Comparative Example 3

[Preparation of Solid Titanium Catalyst Component (E)]

A homogeneous solution was prepared by reacting 95.2 g of anhydrous magnesium chloride with 442 ml of decane and 390.6 g of 2-ethylhexyl alcohol under heating at 130° C. for 2 hours. To the solution, 22.2 g of phthalic anhydride was added, and they were stirred at 130° C. for 1 hour to dissolve phthalic anhydride in the solution.

The homogeneous solution thus obtained was cooled to room temperature. Then, 75 ml of the solution was dropwise added to 200 ml of titanium tetrachloride kept at −20° C., over a period of 1 hour. After the addition was completed, the temperature of the resulting mixture was elevated to 110°

C. over a period of 4 hours. When the temperature reached 110° C., 5.22 g of diisobutyl phthalate (DIBP) was added, followed by stirring at the same temperature for 2 hours. After the 2-hour reaction was completed, a solid portion was recovered by hot filtration. The solid portion was resuspended in 275 ml of titanium tetrachloride, and the reaction was further conducted under heating at 110° C. for 2 hours.

After the reaction was completed, a solid portion was recovered again by hot filtration. The solid portion was sufficiently washed with decane of 110° C. and hexane until any titanium compound liberated in the solution was not detected.

The solid titanium catalyst component (E) prepared through the above operation was stored in the form of a decane slurry, and a part of it was dried for the purpose of examining composition thereof.

In the solid titanium catalyst component (E) thus obtained, 2.4% by weight of titanium, 61% by weight of chlorine, 19% by weight of magnesium, 13.5% by weight of DIBP, 4.0% by weight of decane and 0.1% by weight of 2-ethylhexanol (2-ethylhexyl group) were contained.

[Polymerization]

Polymerization of propylene was carried out in the same manner as described in Example 1 except that the solid titanium catalyst component (E) was used in place of the solid titanium catalyst component (A).

The results are set forth in Table 1.

TABLE 1

| | Acitivity | | | | Bulk specific | |
| --- | --- | --- | --- | --- | --- | --- |
| | g-pp/ mmol-Ti | g-pp/ g-Cat. | t-I.I. % | MFR g/10 min. | gravity g/ml | Melting point |
| Ex. 1 | 40,600 | 19,500 | 96.7 | 3.8 | 0.44 | 161.0 |
| Comp. Ex. 1 | 34,500 | 15,100 | 97.0 | 4.5 | 0.44 | 160.7 |
| Ex. 2 | 38,800 | 18,600 | 96.7 | 3.8 | 0.44 | 160.2 |
| Comp. Ex. 2 | 36,300 | 16,100 | 97.2 | 5.9 | 0.47 | 160.6 |
| Comp. Ex. 3 | 24,600 | 12,300 | 98.0 | 6.1 | 0.46 | 160.7 |

Comparative Examples 4–6

The procedures of Example 1 were repeated except that 6.7 ml of di-n-octyl phthalate (first grade reagent, available from Wako Junyaku K.K.), 6.2 ml of di-n-heptyl phthalate (synthesized in accordance with "New Experiment Course, Synthesis and Reaction of Organic Compounds (II)", p. 1013) and 6.7 ml of di-2-ethylhexyl phthalate (first grade reagent, available from Wako Junyaku K.K.) were used respectively in place of diheptyl phthalate to prepare each solid titanium catalyst component.

Polymerization of propylene was carried out respectively in the same manner as in Example 1 except that the solid titanium catalyst component each obtained above in place of the solid titanium catalyst component (A).

The results are set forth in Table 2.

TABLE 2

| | Phthalic diester (-R group) | Activity | | t-I.I. % | MFR g/10 min. | Bulk specific gravity g/ml |
| --- | --- | --- | --- | --- | --- | --- |
| | | g-pp/ mmol-Ti | g-pp/ g-Cat. | | | |
| Comp. Ex. 4 | -octyl | 28,500 | 12,500 | 96.4 | 6.3 | 0.43 |
| Comp. Ex. 5 | -n-heptyl | 29,200 | 12,800 | 97.5 | 5.1 | 0.42 |
| Comp. Ex. 6 | -2-ethylhexyl | 27,600 | 12,100 | 96.4 | 4.5 | 0.41 |

Example 3

[Preparation of Solid Titanium Catalyst Component (F)]

A homogeneous solution was prepared by reacting 95.2 g of anhydrous magnesium chloride with 442 ml of decane and 390.6 g of 2-ethylhexyl alcohol under heating at 130° C. for 3 hours. To the solution, 22.2 g of phthalic anhydride was added, and they were stirred at 130° C. for 1 hour to dissolve phthalic anhydride in the solution.

The homogeneous solution thus obtained was cooled to room temperature. Then, 33 ml of the solution was dropwise added to 80 ml of titanium tetrachloride kept at −20° C., over a period of 1 hour. After the addition was completed, the temperature of the resulting mixture was elevated to 92° C. over a period of 4 hours. When the temperature reached 92° C., 3.3 ml of the same diheptyl phthalate (mixture of structural isomers) as used in Example 1 was added, followed by stirring at the same temperature for 2 hours. After the 2-hour reaction was completed, a solid portion was recovered by hot filtration. The solid portion was resuspended in 110 ml of titanium tetrachloride, and the reaction was further conducted under heating at 92° C. for 2 hours.

After the reaction was completed, a solid portion was recovered again by hot filtration. The solid portion was washed with decane of 90° C., and then further washed at room temperature sufficiently with hexane until any titanium compound liberated in the solution was not detected.

In the solid titanium catalyst component (F) thus obtained, 2.3% by weight of titanium, 60% by weight of chlorine, 18.5% by weight of magnesium, 12% by weight of diheptyl phthalate, 7% by weight of decane and 0.2% by weight of 2-ethylhexanol (2-ethylhexyl group) were contained.

[Polymerization]

To a 2-liter autoclave was introduced 400 ml of purified n-heptane, and were further introduced 0.4 mmol of triethylaluminum, 0.04 mmol of cyclohexylmethyldimethoxysilane (CMMS) and 0.008 mmol (in terms of Ti atom) of the solid titanium catalyst component (F) at 40° C. in a propylene atmosphere.

To the autoclave was furthermore added 100 ml of hydrogen at 60° C. Then, the temperature of the system was elevated to 70° C. and kept at the same temperature for 1 hour to perform polymerization of propylene. The pressure was kept at 5 kg/cm$^2$-G during the polymerization.

After the polymerization was completed, the resulting slurry containing a solid produced was filtered to separate the slurry into a white powder and a liquid portion.

The yield of the white powdery polymer after drying was 145.9 g, and the boiling heptane extraction residue (II) was 97.84%. This polymer had MFR of 4.2 g/10 min and an apparent bulk specific gravity of 0.41 g/ml. Separately, the liquid portion was concentrated to obtain 0.9 g of a solvent-soluble polymer. Accordingly, the activity was 18,400 g-PP/mmol-Ti and 8,800 g-PP/g-Cat, and II (t-I.I.) in the whole polymer was 97.2%.

The results are set forth in Table 3.

Example 4

[Synthesis of di(2,4-dimethylpentyl)phthalate]

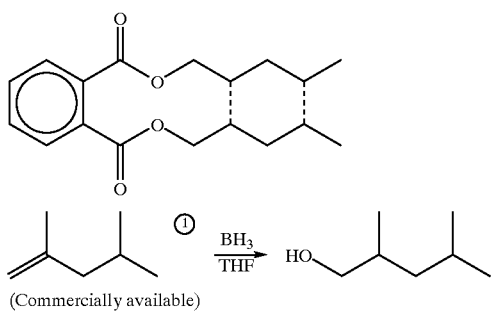

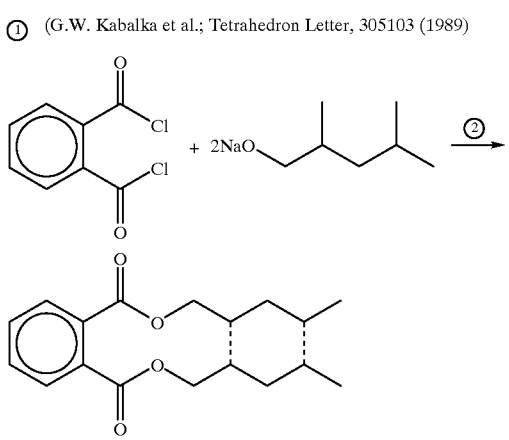

② (New Exp. Chem. Course: 14, Synthesis and Reaction of Organic Compounds (II) P.1013)

[Preparation of solid titanium catalyst component (G)]

The procedures of Example 3 were repeated except that di(2,4-dimethylpentyl)phthalate synthesized above was used in place of diheptyl phthalate, to prepare a solid titanium catalyst component (G).

[Polymerization]

Polymerization of propylene was carried out in the same manner as in Example 3 except that the solid titanium catalyst component (G) was used in place of the solid titanium catalyst component (F).

The results are set forth in Table 3.

Example 5

[Synthesis of di(5-methylhexyl)phthalate]

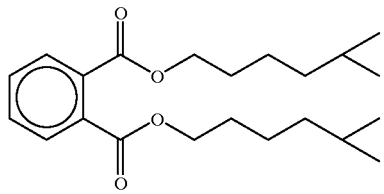

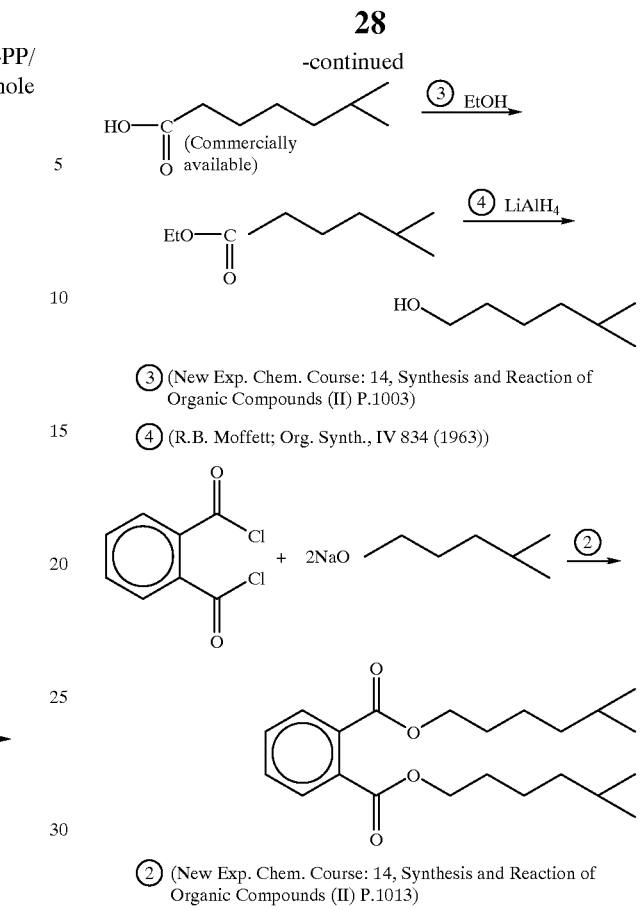

③ (New Exp. Chem. Course: 14, Synthesis and Reaction of Organic Compounds (II) P.1003)

④ (R.B. Moffett; Org. Synth., IV 834 (1963))

② (New Exp. Chem. Course: 14, Synthesis and Reaction of Organic Compounds (II) P.1013)

[Preparation of Solid Titanium Catalyst Component (H)]

The procedures of Example 3 were repeated except that di(5-methylhexyl)phthalate synthesized above was used in place of diheptyl phthalate, to prepare a solid titanium catalyst component (H).

[Polymerization]

Polymerization of propylene was carried out in the same manner as described in Example 3 except that the solid titanium catalyst component (H) was used in place of the solid titanium catalyst component (F).

The results are set forth in Table 3.

Example 6

[Synthesis of di(3-methylhexyl)phthalate]

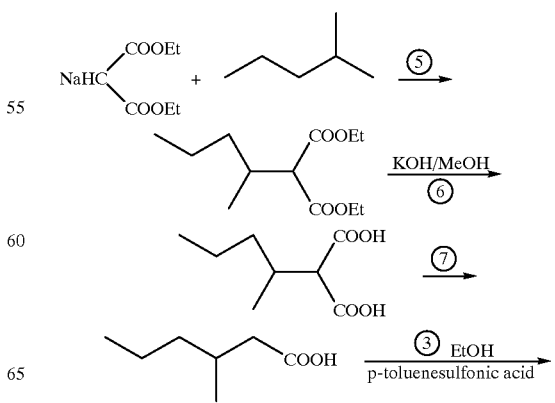

-continued

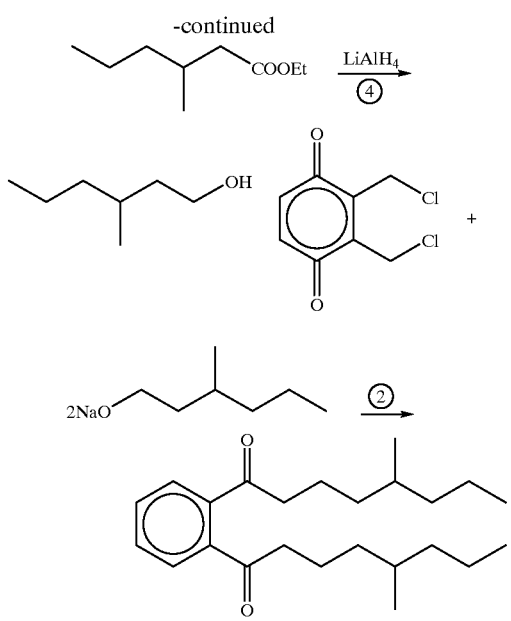

② (New Exp. Chem. Course: 14, Synthesis and Reaction of Organic Compounds (II) P. 1013)

③ (New Exp. Chem. Course: 14, Synthesis and Reaction of Organic Compounds (II) P. 1003)

④ (R.B. Moffett; Org. Synth., IV. 834 (1963)

⑤ (Experim. Manual of Precise Organic Synthesis: P. 162)

⑥ (New Exp. Chem. Course: 14, Synthesis and Reaction of Organic Compounds (II) P. 935)

⑦ (Clarkin Patai: "The Chemistry of Carboxyl Acids and Ester" P. 589)

[Preparation of Solid Titanium Catalyst Component (I)]

The procedures of Example 3 were repeated except that di(3-methylhexyl)phthalate synthesized above was used in place of diheptyl phthalate, to prepare a solid titanium catalyst component (I).

[Polymerization]

Polymerization of propylene was carried out in the same manner as in Example 3 except that the solid titanium catalyst component (I) was used in place of the solid titanium catalyst component (F).

The results are set forth in Table 3.

Comparative Examples 7–9

The procedures of Example 3 were repeated except that 3.6 ml of di-n-octyl phthalate (first grade reagent, available from Wako Junyaku K.K.), 3.3 ml of di-n-heptyl phthalate (synthesized in accordance with "New Experiment Course, Synthesis and Reaction of Organic Compounds (II)", p. 1013) and 3.6 ml of di-2-ethylhexyl phthalate (first grade reagent, available from Wako Junyaku K.K.) were each used in place of diheptyl phthalate to prepare each solid titanium catalyst component.

Polymerization of propylene was carried out in the same manner as in Example 3 except that the solid titanium catalyst component each obtained above was used in place of the solid titanium catalyst component (F).

The results are set forth in Table 3.

TABLE 3

| Phthalic diester (-R group) | Activity g-pp/ mmol-Ti | g-pp/ g-Cat. | t-I.I. % | MFR g/10 min. | Bulk specific gravity g/ml |
|---|---|---|---|---|---|
| Ex. 3 -heptyl (mixture) | 18,400 | 8,800 | 97.2 | 4.2 | 0.41 |
| Ex. 4 -2,4-dimethylpentyl | 15,900 | 7,700 | 97.1 | 5.1 | 0.43 |
| Ex. 5 -5-methylhexyl | 15,000 | 6,900 | 97.4 | 4.7 | 0.40 |
| Ex. 6 -3-methylhexyl | 16,600 | 8,000 | 97.0 | 4.2 | 0.42 |
| Comp. Ex. 7 -octyl | 13,900 | 6,100 | 96.5 | 6.7 | 0.40 |
| Comp. Ex. 8 -n-heptyl | 14,400 | 6,300 | 97.3 | 5.5 | 0.41 |
| Comp. Ex. 9 -2-ethylhexyl | 13,500 | 5,900 | 96.3 | 4.8 | 0.40 |

Examples 7 & 8

Each solid titanium catalyst component was prepared in the same manner as in Example 3 except that the reaction temperature (92° C.) for preparing the solid titanium catalyst component was varied to the temperature set forth in Table 4, and the polymerization of propylene was carried out in the same manner as in Example 3 except that the solid titanium catalyst component each obtained above was used in place of the solid titanium catalyst component (F).

The results are set forth in Table 4.

TABLE 4

| Reaction temperature (° C.) | Activity g-pp/ mmol-Ti | g-pp/ g-Cat. | t-I.I. % | MFR g/10 min. | Bulk specific gravity g/ml |
|---|---|---|---|---|---|
| Ex. 7 | 90 | 17,800 | 8,500 | 97.5 | 3.7 | 0.41 |
| Ex. 8 | 95 | 16,000 | 7,400 | 97.1 | 4.4 | 0.43 |

Example 9

[Preparation of Solid Titanium Catalyst Component (J)]

A homogeneous solution was prepared by reacting 4.76 g (50 mmol) of anhydrous magnesium chloride with 25 ml of decane and 23.4 ml (150 mmol) of 2-ethylhexyl alcohol under heating at 130° C. for 2 hours. To the solution, 0.99 ml (7.5 mmol) of n-butyl cellosolve was added, and they were stirred at 130° C. for 1 hour to dissolve n-butyl cellosolve in the solution.

The homogeneous solution thus obtained was cooled to room temperature. Then, the solution was dropwise added to 200 ml (1.8 mol) of titanium tetrachloride kept at −20° C., over a period of 1 hour. After the addition was completed, the temperature of the resulting mixture was elevated to 92° C. over a period of 4 hours. When the temperature reached 92° C., 5.55 ml (15.0 mmol) of the same diheptyl phthalate (mixture of structural isomers) as used in Example 1 was added, followed by stirring at the same temperature for 2 hours. After the 2-hour reaction was completed, a solid portion was recovered by hot filtration. The solid portion was resuspended in 200 ml of titanium tetrachloride, and the reaction was further conducted under heating at 92° C. for 2 hours.

After the reaction was completed, a solid portion was recovered again by hot filtration. The solid portion was washed with decane of 90° C., and then further washed at room temperature sufficiently with hexane until any titanium compound liberated in the solution was not detected.

The solid titanium catalyst component (J) thus obtained was stored in the form of a hexane slurry, and a part of it was dried for the purpose of examining composition thereof. In the solid titanium catalyst component (J) thus obtained, 2.4% by weight of titanium was contained.

[Polymerization]

To a 1-liter autoclave was introduced 400 ml of purified n-heptane, and were further introduced 0.4 mmol of triethylaluminum, 0.04 mmol of cyclohexylmethyldimethoxysilane (CMMS) and 0.008 mmol (in terms of Ti atom) of the solid titanium catalyst component (J) at 40° C. in a propylene atmosphere.

To the autoclave was furthermore added 100 ml of hydrogen at 60° C. Then, the temperature of the system was elevated to 70° C. and kept at the same temperature for 1 hour to perform polymerization of propylene. The pressure was kept at 5 kg/cm$^2$-G during the polymerization.

After the polymerization was completed, the resulting slurry containing a solid product was filtered to separate the slurry into a white powder and a liquid portion.

The yield of the white powdery polymer after drying was 146.5 g, and the boiling heptane extraction residue (II) was 97.82%. This polymer had MFR of 2.1 g/10 min and an apparent bulk specific gravity of 0.38 g/ml. Separately, the liquid portion was concentrated to obtain 0.8 g of a solvent-soluble polymer. Accordingly, the activity was 18,400 g-PP/mmol-Ti and 9,300 g-PP/g-Cat, and II (t-I.I.) in the whole polymer was 97.3%.

The results are set forth in Table 5.

Example 10
[Preparation of Solid Titanium Catalyst Component (K)]

The procedures of Example 9 were repeated except that 1.47 ml (15 mmol) of methyl acetate was used in place of n-butyl cellosolve, to prepare a solid titanium catalyst component (K).

In the solid titanium catalyst component (K) thus obtained, 2.5% by weight of titanium was contained.

[Polymerization]

Polymerization of propylene was carried out in the same manner as in Example 9 except that the solid titanium catalyst component (K) was used instead of the solid titanium catalyst component (J).

The results are set forth in Table 5.

Example 11
[Preparation of Solid Titanium Catalyst Component (L)]

The procedures of Example 9 were repeated except that 1.12 ml (15 mmol) of propionic acid was used in place of n-butyl cellosolve.

In the solid titanium catalyst component (L) thus obtained, 2.3% by weight of titanium was contained.

[Polymerization]

Polymerization of propylene was carried out in the same manner as in Example 9 except that the solid titanium catalyst component (L) was used instead of the solid titanium catalyst component (J).

The results are set forth in Table 5.

Comparative Example 10
[Preparation of Solid Titanium Catalyst Component]

The procedures of Example 9 were repeated except that 5.98 ml (15 mmol) of di-n-octyl phthalate was used in place of diheptyl phthalate, to prepare a solid titanium catalyst component.

In the solid titanium catalyst component thus obtained, 2.0% by weight of titanium was contained.

[Polymerization]

Polymerization of propylene was carried out in the same manner of Example 9 except that the solid titanium catalyst component obtained above was used in place of the solid titanium catalyst component (J).

The results are set forth in Table 5.

Comparative Example 11
[Preparation of Solid Titanium Catalyst Component]

The procedures of Example 9 were repeated except that 5.49 ml (15 mmol) of di-n-heptyl phthalate was used in place of diheptyl phthalate, to prepare a solid titanium catalyst component.

In the solid titanium catalyst component thus obtained, 2.1% by weight of titanium was contained.

[Polymerization]

Polymerization of propylene was carried out in the same manner as in Example 9 except that the solid titanium catalyst component obtained above was used in place of the solid titanium catalyst component (J).

The results are set forth in Table 5.

Comparative Example 12
[Preparation of Solid Titanium Catalyst Component]

The procedures of Example 9 were repeated except that 1.47 ml (15 mmol) of methyl acetate was used in place of n-butyl cellosolve and 5.98 ml (15 mmol) of di-n-octyl phthalate was used in place of diheptyl phthalate, to prepare a solid titanium catalyst component.

In the solid titanium catalyst component thus obtained, 2.4% by weight of titanium was contained.

[Polymerization]

Polymerization of propylene was carried out in the same manner as in Example 9 except that the solid titanium catalyst component obtained above was used in the place of the solid titanium catalyst component (J).

The results are set forth in Table 5.

Comparative Example 13
[Preparation of Solid Titanium Catalyst Component]

The procedures of Example 9 were repeated except that 1.12 ml (15 mmol) of propionic acid was used in place of n-butyl cellosolve and 5.98 ml (15 mmol) of di-n-octyl phthalate was used in place of diheptyl phthalate, to prepare a solid titanium catalyst component.

In the solid titanium catalyst component thus obtained, 2.3% by weight of titanium was contained.

[Polymerization]

Polymerization of propylene was carried out in the same manner as in Example 9 except that the solid titanium catalyst component obtained above was used in place of the solid titanium catalyst component (J).

The results are set forth in Table 5.

TABLE 5

| | Phthalic diester (-R group) | Electron donor (D-2) | Activity g-pp/ mmol-Ti | Activity g-pp/ g-Cat. | t-I.I. % | MFR g/10 min. | Bulk specific gravity g/ml |
|---|---|---|---|---|---|---|---|
| Ex. 9 | -heptyl (mixture) | Butyl cellosolve | 18,400 | 9,300 | 97.3 | 2.1 | 0.38 |
| Comp. Ex. 10 | -n-octyl | Butyl cellosolve | 15,600 | 6,500 | 96.2 | 5.2 | 0.38 |
| Comp. Ex. 11 | -n-heptyl | Butyl cellosolve | 15,100 | 6,600 | 96.8 | 4.3 | 0.38 |
| Ex. 10 | -heptyl (mixture) | Methyl acetate | 15,700 | 8,200 | 97.6 | 2.5 | 0.33 |
| Comp. Ex. 12 | -n-octyl | Methyl acetate | 13,400 | 6,700 | 96.9 | 4.8 | 0.33 |
| Ex. 11 | -heptyl (mixture) | Propionic acid | 15,800 | 7,600 | 97.5 | 3.3 | 0.41 |
| Comp. Ex. 13 | -n-octyl | Propionic acid | 12,700 | 6,100 | 96.7 | 5.9 | 0.41 |

Comparative Example 14
[Preparation of Solid Titanium Catalyst Component]
The procedures of Example 3 were repeated except that the reaction temperature was changed from 92° C. to 83° C.
[Polymerization]
Polymerization of propylene was carried out in the same manner as in Example 3.
The results are set forth in Table 6.

Comparative Example 15
[Preparation of Solid Titanium Catalyst Component]
The procedures of Example 3 were repeated except that the reaction temperature was changed from 92° C. to 97° C.
[Polymerization]
Polymerization of propylene was carried out in the same manner as in Example 3.
The results are set forth in Table 6.

TABLE 6

| | Reaction temp. (° C.) | Activity g-pp/ mmol-Ti | Activity g-pp/ g-Cat. | t-I.I. % | MFR g/10 min. | Bulk specific gravity g/ml |
|---|---|---|---|---|---|---|
| Comp. Ex. 14 | 83 | 7,500 | 4,400 | 96.7 | 5.7 | 0.40 |
| Comp. Ex. 15 | 97 | 13,000 | 6,000 | 97.1 | 4.7 | 0.42 |

Comparative Example 16
[Preparation of Solid Titanium Catalyst Component]
The procedures of Example 9 were repeated except that the reaction temperature was changed from 92° C. to 83° C.
[Polymerization]
Polymerization of propylene was carried out in the same manner as in Example 9.
The results are set forth in Table 7.

Comparative Example 17
[Preparation of Solid Titanium Catalyst Component]
The procedures of Example 10 were repeated except that the reaction temperature was changed from 92° C. to 83° C.
[Polymerization]
Polymerization of propylene was carried out in the same manner as in Example 9.
The results are set forth in Table 7.

TABLE 7

| | Reaction temperature (° C.) | Phthalic diester (-R group) | Electron donor (D-2) | Activity g-pp/ mmol-Ti | Activity g-pp/ g-Cat. |
|---|---|---|---|---|---|
| Comp. Ex. 16 | 83 | -heptyl (mixture) | n-butyl cellosolve | 7,100 | 4,600 |
| Comp. Ex. 17 | 83 | -heptyl (mixture) | methyl-acetate | 6,600 | 4,000 |

| | t-I.I. % | MFR g/10 min. | Bulk specific gravity g/ml |
|---|---|---|---|
| Comp. Ex. 16 | 96.1 | 3.9 | 0.35 |
| Comp. Ex. 17 | 96.3 | 4.1 | 0.29 |

What is claimed is:
1. A process for olefin polymerization comprising polymerizing olefins having 2 to 20 carbon atoms at a temperature of about 20 to 300° C. and at a pressure of from atmospheric pressure to 100 kg/cm² in the presence of an olefin polymerization catalyst comprising the following components (I), (II) and (III);
   (I) a solid titanium catalyst component which comprises
      magnesium,
      titanium,
      halogen,
      (C) a phthalic diester represented by the following formula (i),

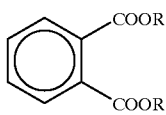

(i)

wherein R is a branched hydrocarbon group having a total of seven carbon atoms and being substituted with at least one branched methyl substituent, and two of Rs may be the same as or different from each other, and
      (D) an electron donor other than the phthalic diester (C), wherein said solid titanium catalyst component (I) is obtained by contacting a hydrocarbon solution of a magnesium compound (A) with a titanium compound (B) in a liquid state to form a solid product or first preparing a hydrocarbon solution of the magnesium compound (A) and the titanium compound (B) and then forming a solid product therefrom, said reaction of forming the solid product being carried out in the presence of at least one electron donor (D-2) as said electron donor (D), which is selected from the group consisting of mono-carboxylic acid esters, aliphatic carboxylic acids, acid anhydrides, ketones, ethers, alkoxy group containing alcohols, aliphatic carbonates, organic silicone compounds and organic phosphorous compounds having a P—O—C bond, and after the formation of the solid product, contacting the solid product with the phthalic diester (C), said contact of the magnesium compound (A) with the titanium compound (B) being carried out at a sufficiently low temperature and thereafter elevating the temperature to 87° C. to 95° C., where the amount of said at least one electron donor (D-2) is 0.01 to 1.0 mole per mole of the magnesium compound (A) and the amount of said phthalic diester (C) is 0.05 to 0.5 mole per mole of the magnesium compound (A);

(II) an organometallic compound catalyst component represented by the following formula, $$R^a{}_n AlX_{3-n}$$

wherein $R^a$ is a hydrocarbon group of 1 to 12 carbon atoms, X is halogen or hydrogen, and n is 1 to 3; and (III) an electron donor represented by the following formula, $$R_n Si(OR')_{4-n}$$

wherein R and R' are each a hydrocarbon group, and 0<n<4, or a polyether;

wherein the amount of the solid catalyst component (I) is 0.001 to 100 mmol, in terms of Ti atom, based on 1 liter of the polymerization volume, the amount of metal atom in the organometallic compound catalyst component (II) is in the range of 1 to 2000 mole, based on 1 mole of the titanium atom in the solid catalyst component (I), and the amount of the electron donor (III) is 0.001 to 10 mole, based on 1 mole of the metal atom in the organometallic compound catalyst component (II); and wherein said contact of the magnesium compound (A) with the titanium compound (B) is carried out at a sufficiently low temperature and thereafter elevating the temperature to 87° C. to 95° C., wherein the temperature is maintained to 87° C. to 95° C. upon the addition of the phthalic diester (C).

2. The process as in claim 1, wherein said contact of the hydrocarbon solution of the magnesium compound (A) with the titanium compound (B) in the liquid state is carried out by contacting the magnesium compound (A) with an electron donor (D-1) as said electron donor (D) in the presence of a hydrocarbon solvent with or without heating the obtained mixture to prepare a magnesium compound solution;

contacting the magnesium compound solution with said electron donor (D-2) to prepare a magnesium-electron donor (D-2) solution; and contacting the magnesium-electron donor (D-2) solution with the titanium compound (B) in the liquid state;

said electron donor (D-1) being selected from the group consisting of alcohols, phenols, ketones, aldehydes, ethers, amines, pyridines and metallic acid esters.

3. The process as in claim 1, wherein said solid titanium catalyst component (I) is further contacted with the titanium compound (B) in the liquid state.

4. The process of claim 1, wherein said olefins are selected from the group consisting of ethylene, propylene, 1-butene, 3-methyl-1-butene, 4-methyl-1-pentene, vinylcyclohexane, dimethylstyrene, allyltrimethylsilane and allylnapthalene.

5. The process of claim 1, wherein said olefins are selected from the group consisting of ethylene, propylene, 1-butene, 3-methyl-1-butene and 4-methyl-1-pentene.

6. The process of claim 1, wherein said olefins are polymerized into a homopolymer or copolymer of propylene.

* * * * *

UNITED STATES PATENT AND TRADEMARK OFFICE
CERTIFICATE OF CORRECTION

PATENT NO. : 6,034,189
DATED : March 7, 2000
INVENTOR(S) : Tetsunori SHINOZAKI, YASUSHI NAKAYAMA, JUNJI SAITO, KENJI SUGIMORA and MAMORU KIOKA It is certified that error appears in the above-identified patent and that said Letters Patent is hereby corrected as shown below:

Please amend section [63] to read as follows "Continuation-In-Part of Application Number 08/444,680, May 19, 1995, Abandoned."

Signed and Sealed this

Twenty-ninth Day of May, 2001

Attest:

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO.   : 6,034,189
DATED        : March 7, 2000
INVENTOR(S)  : Tetsunori Shinozaki et al.

It is certified that error appears in the above-identified patent and that said Letters Patent is hereby corrected as shown below:

Title page,
Section [*] Notice, please delete the following sentence: "This patent is subject to a terminal disclaimer."

Signed and Sealed this

Thirteenth Day of November, 2001

Attest:

NICHOLAS P. GODICI
Attesting Officer    Acting Director of the United States Patent and Trademark Office